United States Patent Office 3,019,847
Patented Feb. 6, 1962

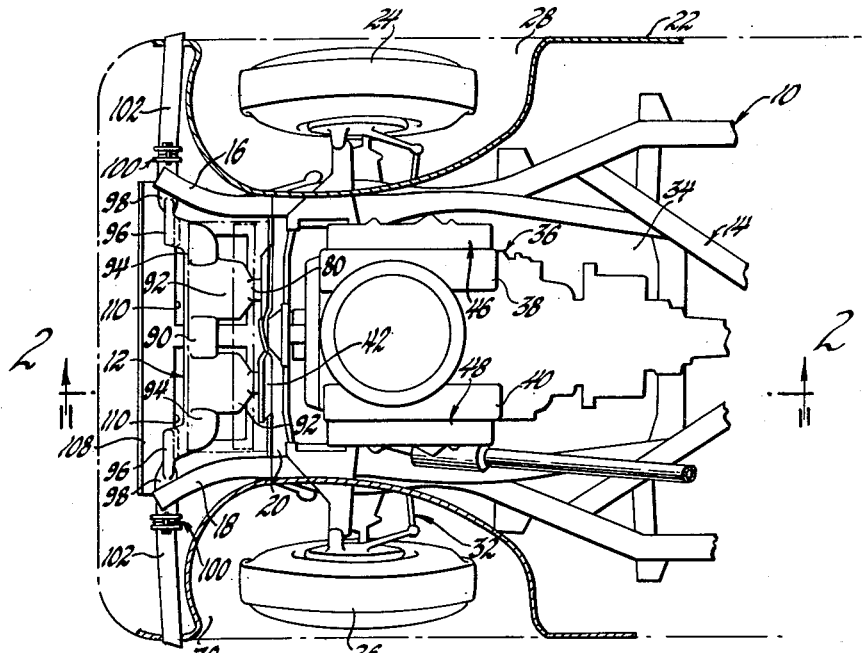

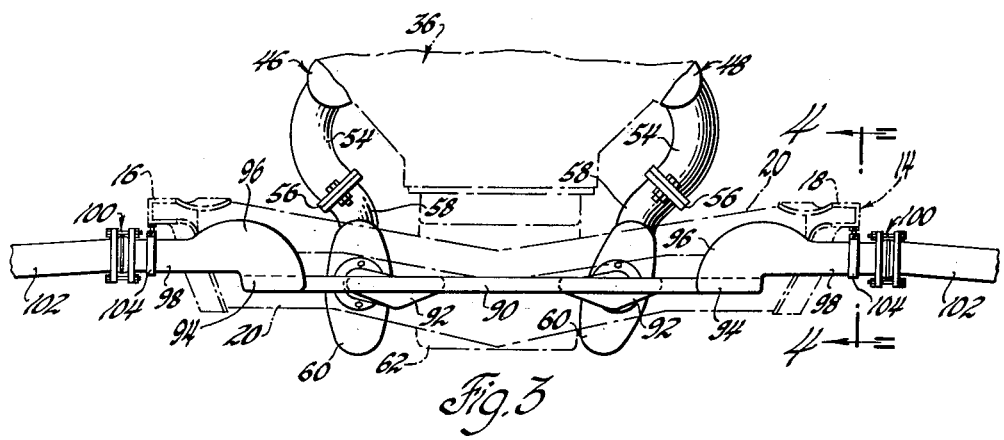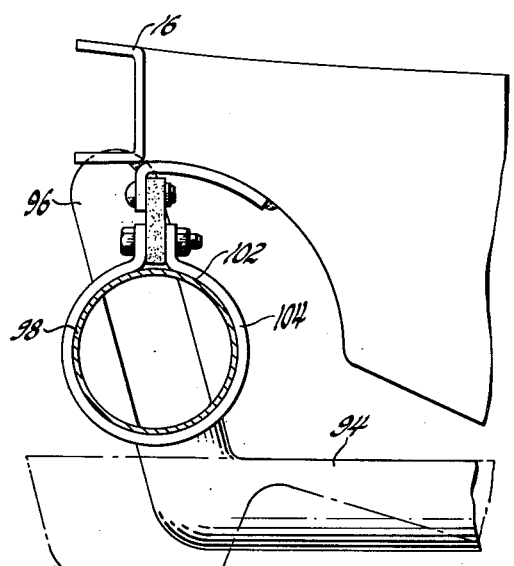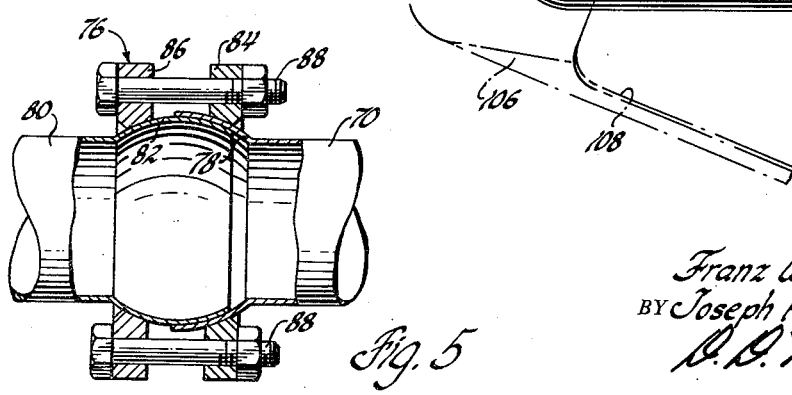

3,019,847
EXHAUST SYSTEM FOR VEHICLE INTERNAL COMBUSTION ENGINE
Franz W. Abramson, Glendale, Calif., and Joseph H. Gilson, Warren, Mich., assignors to General Motors Corporation, Detroit, Mich., a corporation of Delaware
Filed June 29, 1960, Ser. No. 39,515
5 Claims. (Cl. 180—64)

The invention relates to an exhaust system for internal combustion engines used in motor vehicles and particularly to an exhaust system which is situated entirely in the portion of the vehicle adjacent and including the engine compartment.

It is common practice to construct motor vehicles with an engine compartment in the forward end of the vehicle and to connect an exhaust system to the vehicle engine which extends underneath the vehicle to a point adjacent the back end of the vehicle where the exhaust gases are discharged into the atmosphere. Such a system involves a complicated and expensive piping arrangement. Systems of this nature are also fully exposed to atmospheric and road conditions which lead to quick deterioration of the system components. This is particularly true in areas in which salt or other corrosive chemicals may be utilized in winter to keep roads clear of ice and snow.

It is now proposed to provide an exhaust system which is contained partially within the vehicle engine compartment and is more fully protected than heretofore. Although the system may be adapted for rear engine vehicles, it is most advantageous in a vehicle having the engine mounted forward of the passenger compartment. The system is compactly designed so as to discharge engine exhaust gases in front of the vehicle front wheel wells where the gases are readily dissipated to the atmosphere. The system is formed to provide a sufficient length of exhaust pipe for acoustical purposes even though the entire system extends for a short longitudinal distance in the vehicle. Sufficient flexible joints are preferably provided in the system to permit easy installation and removal, the flexible joints being tightened to render the system immobile while installed. The system may be installed so as to be exposed to cooling air passing through a vehicle underbody opening, the air then passing underneath the vehicle engine and having no effect on the efficiency of operation of the vehicle radiator and any other equipment of this nature.

In the drawings:

FIGURE 1 is a plan view of the front portion of a motor vehicle including the engine compartment and having an exhaust system embodying the invention installed therein.

FIGURE 2 is a side elevation view with parts broken away and in section, and is taken in the direction of arrows 2—2 of FIGURE 1.

FIGURE 3 is a front elevation view of the installation embodying the invention as taken in the direction of arrows 3—3 of FIGURE 2 and having portions illustrated in phantom.

FIGURE 4 is an enlarged detail section view having parts broken away and in phantom and taken in the direction of arrows 4—4 of FIGURE 3.

FIGURE 5 is a view of a typical one of the joints utilized in the system and having parts broken away and in section.

The motor vehicle 10 in which the exhaust system 12 embodying the invention is installed may be of any suitable construction and is illustrated as having a frame 14 including frame side rails 16 and 18 and a frame front cross member 20. The vehicle sheet metal 22 forming the front fenders and wheel housings enclose the vehicle wheels 24 and 26 and defines vehicle wheel wells 28 and 30 in which the front wheels 24 and 26 are rotated and steered. Any suitable vehicle suspension and steering system 32 may be provided. The vehicle also has an engine compartment 34 located between the wheel wells 28 and 30 and extending rearwardly to include space for other portions of the vehicle drive line. The internal combustion engine 36 is suitably mounted in the engine compartment 34 and is illustrated as being a V-type engine having banks 38 and 40 of cylinders extending generally longitudinally of the vehicle. Other engine components illustrated include the cooling fan 42 and the radiator 44. Each of the cylinder banks 38 and 40 is provided with an exhaust manifold, manifold 46 being provided for cylinder bank 38 and manifold 48 being provided for cylinder bank 40. If an engine of the in-line type is used, only one exhaust manifold probably would be provided. It is understood that the construction illustrated and described may be modified for use with in-line engines if desired.

The exhaust manifolds 46 and 48 receive exhaust gases from the various cylinders in their respective banks through manifold inlet sections 50 which are connected with a longitudinal exhaust passage 52. Gases from passage 52 pass out of the manifold through downwardly and inwardly extending passages 54 which are preferably contoured to generally follow the side surfaces of the engine 36 underneath the cylinder banks. This is best illustrated in FIGURE 3. Suitable exhaust manifold joints 56 connect exhaust manifolds 46 and 48 to the remainder of the exhaust system 12.

Since in a V-engine installation the left and right hand sections of the exhaust system 12 are substantially reversed but otherwise identical, only the left hand portion of the system will be described in detail. This portion is best illustrated in FIGURES 2 and 3.

A short exhaust pipe section 58 is connected by joint 56 to the exhaust manifold 48 and may be integrally formed with or connected to the exhaust muffler 60. Muffler 60 is illustrated as being of the oval type and nested along the engine oil pan section 62. Pipe section 58 extends from one side of muffler 60 and delivers exhaust gases from manifold 48 into the muffler. The forward end 64 of muffler 60 is provided with a pipe section 66 which conducts exhaust gases from the muffler to the next portion of the system. Pipe section 66 extends forwardly of muffler 60 and is generally parallel to the engine 36. It terminates short of the frame front cross member 20 and is provided with a ball type universal joint 68 by which it is connected to the next exhaust pipe section 70. Section 70 extends through passage 72 suitably formed in the frame front cross member 20. If required, suitable insulation 74 may be installed about pipe 72 to minimize the transfer of heat from the exhaust system to the frame front cross member.

Pipe section 70 extends forwardly beyond cross member 20 and terminates at another ball type universal joint 76. FIGURE 5 illustrates a joint of the type used throughout the system beyond the muffler. Considering the joint of FIGURE 5 to be joint 76, pipe 70 has a spherical section flange 78 extending forwardly to the approximate maximum diameter of the sphere from which the spherical flange section is formed. Exhaust pipe section 80 is connected to pipe section 70 by joint 76 and has a rearwardly extending spherical section flange 82 which extends beyond the maximum diameter of the sphere from which the section is formed so that its outer surface spherically engages the inner surface of flange 78 to provide a flexible ball type universal joint construction. Clamping rings 84 and 86 are respectively secured to flanges 78 and 82 by any suitable means so that when pipe sections 70 and 80 are in the desired relative positions the flanges are substantially parallel. Bolt and nut assemblies 88 extend through suitably formed apertures in flanges 84 and 86 and are tightened so as to rigidify the joint 76 after pipes 70 and 80 are located in their correct positions relative to each other. This may be done prior to installation of the assembly for some of the joints, if convenient, and may be done after the assembly is in position on the vehicle for any joints for which it is most convenient to do so. By having the joint flexible during installation of the exhaust system 12, the system may be easily aligned and then rigidified.

A laterally extending exhaust pipe member 90 is located forwardly of frame front cross member 20 when in the installed position and a pipe 80 for each of the left hand and right hand system sections is connected thereto on either side of the centerline of the engine 36. Since the space in the portion of the vehicle forward of the frame front cross member is often at a minimum particularly in the vertical, it may be desirable to form the lateral pipe 90 so that it has a narrow vertical dimension with the generally horizontal dimension being extended to maintain sufficient pipe cross section area to prevent restrictive gas flow. Pipe member 90 thus presents a flattened appearance and the pipe sections 80 have their forward ends 92 flattened and laterally expanded so that they provide a smooth transition of exhaust gas flow to the lateral pipe member 90.

The outer ends of pipe 90 are curved in a generally horizontal plane forwardly as indicated at 94 then in the vertical plane as indicated at 96 and then outwardly as indicated at 98. The terminal ends of section 98 may be formed in a generally round configuration and having joints 100 similar to the other joints used in the system so that the end pipes 102 are connected thereto. The configuration of the ends of lateral pipe 90 permit a sufficient exhaust pipe length to be used for acoustical purposes so that the system is tuned to maintain a low noise level. The curves in the ends of the pipe may at the same time be formed in directions commensurate with the vehicle frame and front end construction so as to fit therein without interference. The end pipes 102 extend laterally to points just forward of the vehicle wheel wells 28 and 30 and discharge exhaust gases into the atmosphere somewhat forwardly of the wheels 24 and 26. Suitable exhaust pipe hangers 104 are provided and it has been found that they are conveniently located on the rounded ends of the pipe sections 98 where they may be attached to frame side rails 16 and 18.

Since portions of the exhaust system 12 may be positioned immediately adjacent the radiator 44 and are therefore likely to transmit heat thereto, a reflecting type insulator 106 may be suitably secured to the vehicle intermediate the exhaust system 12 and the radiator 44. In the illustration contained in the drawings the lateral pipe member 90 and the flattened ends 92 of pipes 80 are underneath the adjacent radiator 44 with insulator 106 extending therebetween to prevent the undesirable heat transfer. The body of the vehicle may include a gravel pan or deflector 108 which may be integral with the vehicle bumper or a separate piece. Deflector 108 extends backwardly underneath the forward side of frame front cross member 20 and encloses the forward portion of the exhaust system 12. Suitable exhaust cooling air intake openings 110 may be provided in the deflector so that cooling air passes around lateral pipe member 90 and pipe sections 80, 70 and 66. This will further reduce the transfer of heat to other portions of the vehicle.

An exhaust system completely contained within the front end of a vehicle has been provided which maintains desirable acoustical properties, fits within the vehicle frame and sheet metal construction, is not exposed to damaging road contaminants, is readily installed and replaced, and is less expensive since it requires less piping.

What is claimed is:

1. In an engine exhaust system for a vehicle having an internal combustion engine and a vehicle frame and a vehicle body defining wheel wells and spaced vehicle wheels mounted for rotation in said wheel wells, an engine exhaust manifold connected with said engine to receive exhaust gases therefrom and having a discharge passage, an exhaust muffler connected with said discharge passage and mounted in generally parallel relation to and nested against said engine and having a discharge pipe section extending therefrom, a second pipe section joined to said discharge pipe section and extending forwardly through a portion of said vehicle frame, a lateral pipe section joined to said second pipe section and extending upwardly and outwardly laterally beyond said frame and discharging the exhaust gases from said engine through said vehicle body adjacent a vehicle wheel well.

2. An exhaust system for an internal combustion engine having an oil pan and a pair of generally parallel exhaust manifolds above and transversely outward thereof, said system comprising a pair of parallel mufflers respectively connectible with said exhaust manifolds on opposite sides of said engine in nested relation to said oil pan and having discharge pipes extending therefrom in parallel, a pair of parallel exhaust pipe sections having ball type joints respectively connecting with said discharge pipes, a pipe member having a central portion extending substantially normal to said pair of pipe sections and connected therewith to receive exhaust gases therefrom and further having end portions bent to extend first in a direction substantially parallel to said pair of pipe sections and secondly in a direction generally normal to said first direction and said central portion and thirdly in opposite relative directions to discharge exhaust gases laterally and provide a total exhaust pipe length effective for acoustical tuning of said system.

3. The exhaust system of claim 2, said transversely extending pipe member central portion and the end portions thereof extending in said first and second directions each being flatly formed to provide a non-circular cross section having an exhaust gas conducting cross section area at least equal to the cross section area of each of said pair of pipe sections whereby said transversely extending pipe member permits free flow of exhaust gases therethrough.

4. An exhaust system for an internal combustion engine installed in a motor vehicle at one end thereof, said exhaust system comprising two sections positioned adjacent and substantially parallel to said engine, each of said sections having an exhaust manifold connected with said engine to receive exhaust gases therefrom and an exhaust muffler connected therewith in juxtaposed relation to said engine and a plurality of coaxial pipe sections extending toward the adjacent end of the motor vehicle and joined together in exhaust gas flow series with said mufflers, a transverse exhaust pipe member connected with said two sections to receive the exhaust gases therefrom and having ends for discharging the exhaust gases to the atmosphere, said ends extending substantially laterally of said vehicle.

5. An exhaust system for a V-type internal combustion engine installed in a motor vehicle having a vehicle frame, said exhaust system having a pair of parallel sections each comprising an engine exhaust manifold connected with one bank of cylinders of said engine to receive exhaust gases therefrom and a muffler and a jointed pipe section connected in series with said muffler and said exhaust manifold and extending through a portion of said engine frame, each of said mufflers extending underneath one bank of cylinders in nested relation with said engine, an exhaust pipe extending transversely of said vehicle and receiving engine exhaust gases from said pipe sections and discharging the exhaust gases to the atmosphere, and heat reflecting means intermediate said radiator and the portions of said system adjacent said radiator for reflecting heat radiated from said exhaust pipe sections to protect said radiator.

References Cited in the file of this patent
UNITED STATES PATENTS

| | | |
|---|---|---|
| 2,011,988 | Timian | Aug. 20, 1935 |
| 2,078,420 | Sheldrick | Apr. 27, 1937 |
| 2,814,178 | Augsburger et al. | Nov. 26, 1957 |